March 15, 1966 R. A. MAHAFFY 3,240,318
PACKAGING APPARATUS
Filed March 4, 1964 3 Sheets-Sheet 1
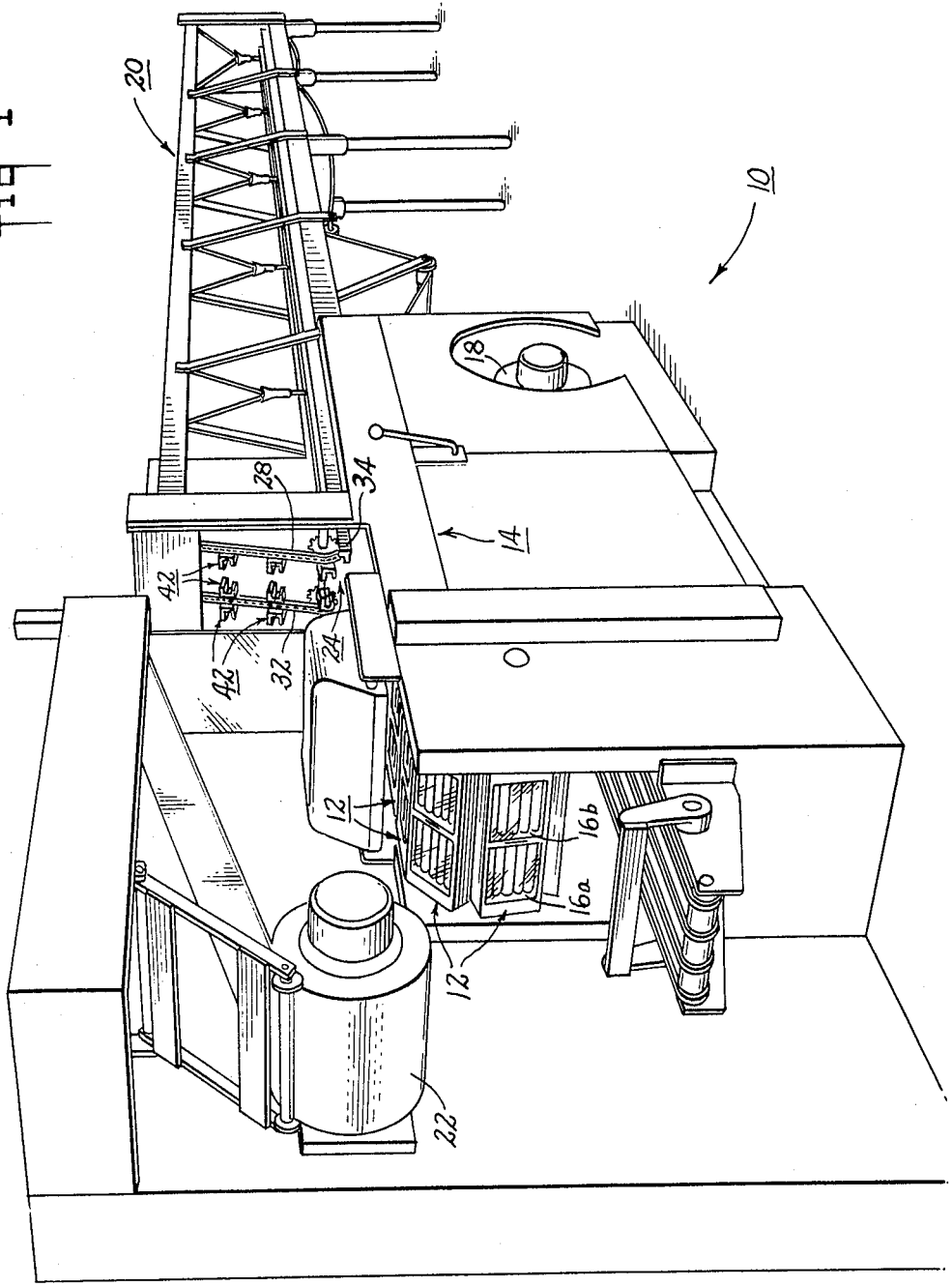
INVENTOR
Reid A. Mahaffy
BY
Curtis Morris + Safford
ATTORNEYS March 15, 1966  R. A. MAHAFFY  3,240,318
PACKAGING APPARATUS
Filed March 4, 1964  3 Sheets-Sheet 2
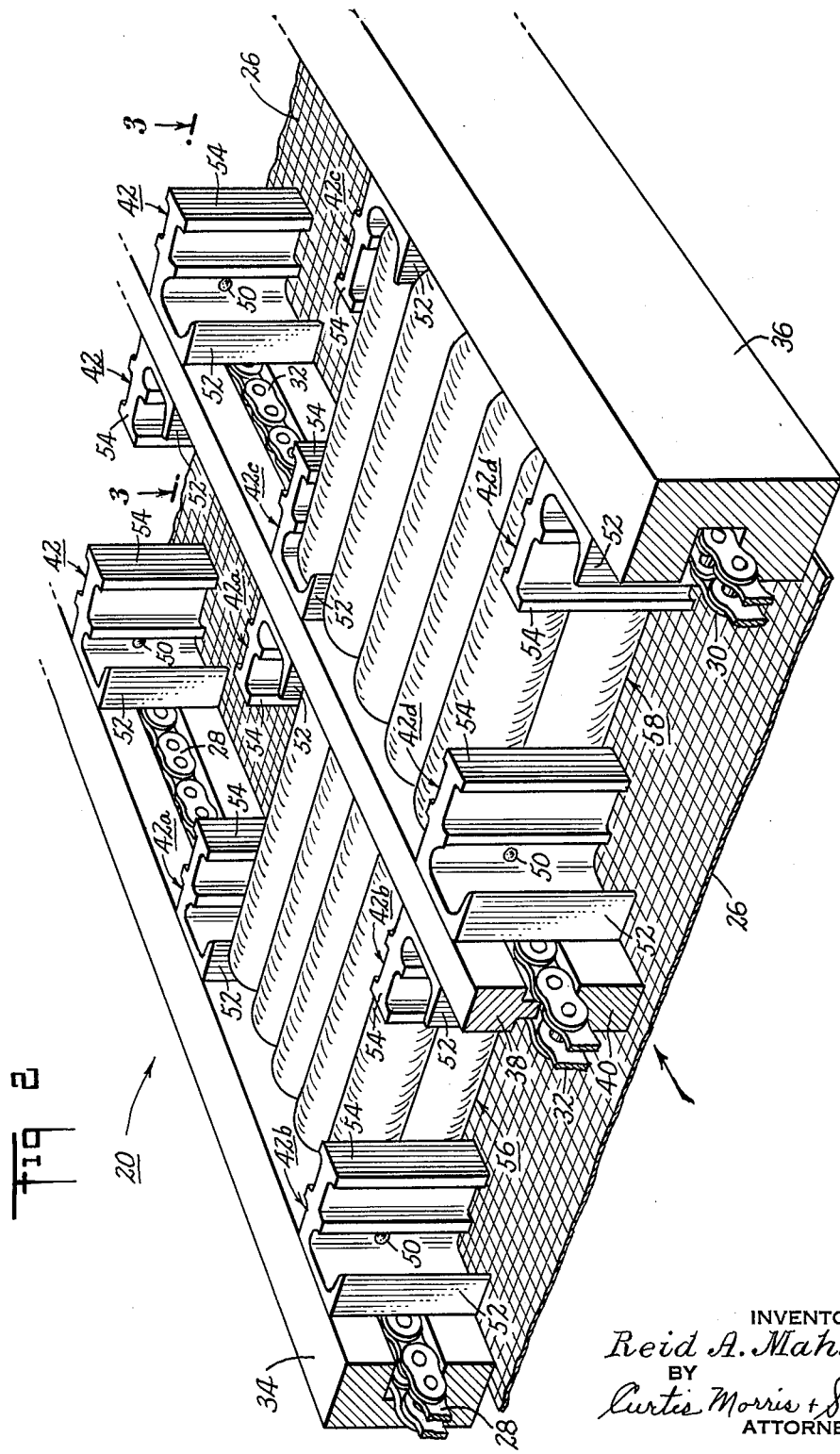
INVENTOR
Reid A. Mahaffy
BY
Curtis, Morris + Safford
ATTORNEYS

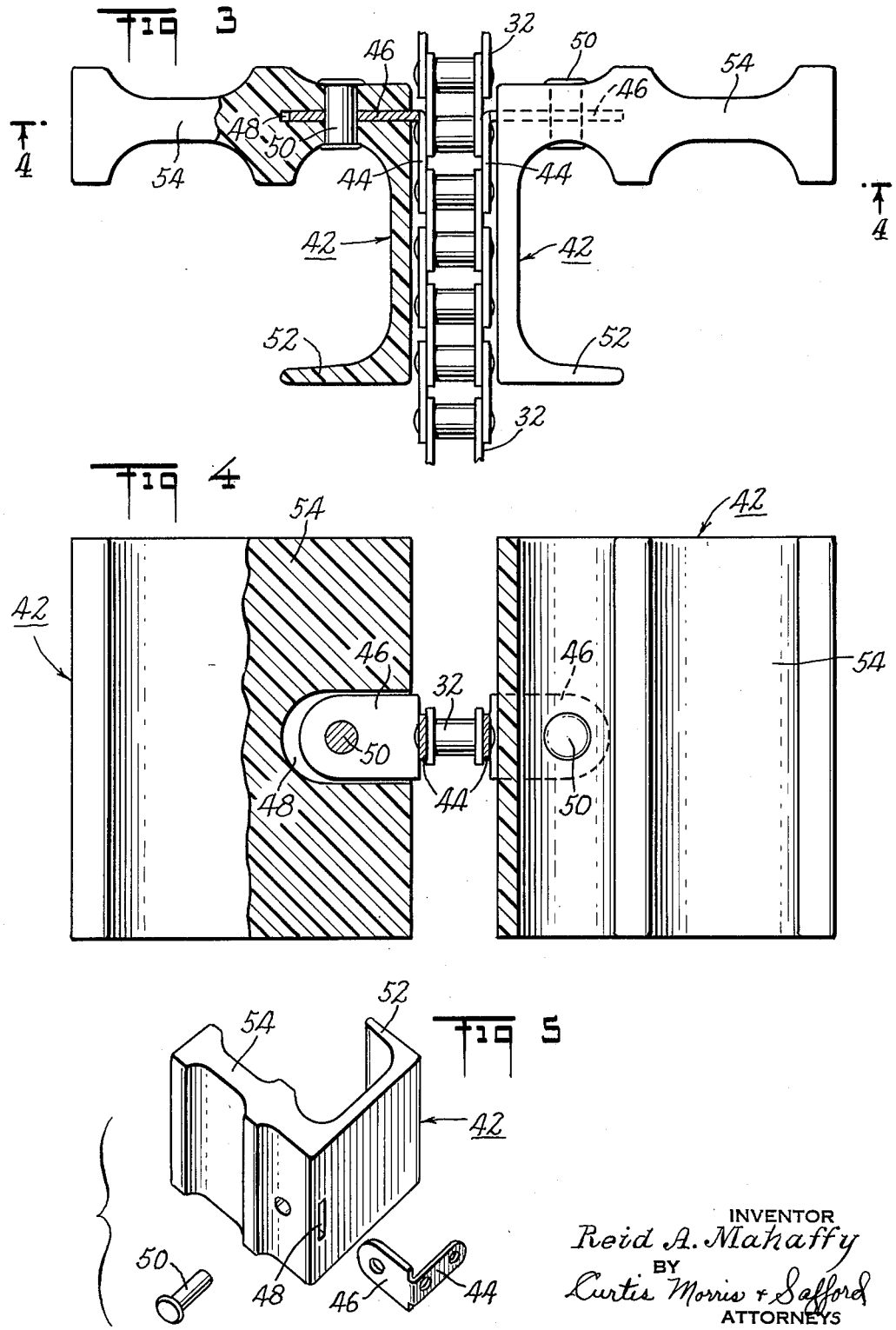

United States Patent Office 3,240,318
Patented Mar. 15, 1966

3,240,318
PACKAGING APPARATUS
Reid A. Mahaffy, Montclair, N.J., assignor to Mahaffy &
Harder Engineering Company, Totowa, N.J.
Filed Mar. 4, 1964, Ser. No. 349,239
12 Claims. (Cl. 198—164)

This invention relates to automatic packaging machines. More in particular, this invention relates to packaging apparatus including improved means for collating the products to be packaged and for transferring such collated products to respective movable container-forming receptacles wherein the packaging, evacuation and sealing operations are performed.

Automatic packaging machines have been used commercially for some time now for packaging meat products and the like in gas-tight containers in which such products are displayed in retail stores for sale to consumers. To facilitate high-speed operation of such packaging machines, it is known to provide a power-operated mechanism for automatically and reliably loading the products into the container-forming receptacles, such as by means of a transfer ram arranged to push the products into the container-formnig receptacles as the latter move into a loading position. For many types of products, e.g. frankfurters, it is necessary first to collate the products into groups of predetermined numbers or sizes, and then to transfer these collated groups to the automatic loading mechanism.

In one particularly successful arrangement, described in detail in U.S. Patent 3,180,066, the packaging apparatus includes an infeed conveyor system comprising an endless belt and a series of small block-shaped flights positioned over the belt at longitudinally spaced points to define box-like enclosures of appropriate size to receive the predetermined number of frankfurters in each group. The frankfurters are placed in the flighted enclosures by personnel stationel alongside the conveyor. The endless belt system carries the frankfurters to the loading station where they are shifted onto a pair of trap doors for transfer as a group to a corresponding container-forming receptacle by the downward motion of a power-operated ram.

Experience with such packaging apparatus has demonstrated a need for additional flexibility in arranging the equipment for use with products of different sizes. For example, it is desirable from a marketing standpoint to provide frankfurter packages of both 12 and 16 oz. net weight, these packages however each containing a total of ten frankfurters in a five-over-five arrangement. With packaging apparatus as disclosed in the above-identified application, a change from one frankfurter size to another would introduce serious problems. In particular, if the size of the frankfurters is reduced, the collated groups will verly likely be disarranged while on the conveyor or when being transferred to the loading station, due to the fact that the frankfurter group is too small for the flighted enclosure in which it is placed. Since the collation cannot be maintained all the way into the package, there is a serious risk that the product would be damaged or present an unattractive appearance due to the disarrangement of the group. This difficulty can of course be avoided by replacing the entire conveyor system by similar apparatus of smaller size, but this is impractical both because of the costs of the replacement equipment and because of the loss in machine production time during the changeover.

Accordingly, it is an object of this invention to provide packaging apparatus which is superior to that provided heretofore. A specific object of this invention is to provide packaging apparatus including improved product collating and conveyor equipment. Still another object of this invention is to provide packaging apparatus having collating and conveyor apparatus which is suited for products of different sizes, so that the packaging apparatus can be operated with such different size products without substantial modification. Other objects, aspects and advantages of this invention will in part be pointed out in, and in part apparent from, the following description considered together with the accompanying drawings, in which:

FIGURE 1 is a perspective view of a packaging machine incorporating the present invention;

FIGURE 2 is a perspective view of a portion of the collating and conveyor apparatus, as seen from the conveyor end of the machine and looking towards the loading station;

FIGURE 3 is a plan view, taken along line 3—3 of FIGURE 2, showing details of the conveyor flight construction;

FIGURE 4 is a vertical section taken along line 4—4 of FIGURE 3, showing further details of the manner in which the flights are secured to the chain; and FIGURE 5 is an exploded view of one of the flights and the parts for connecting the flight to its support chain.

Referring first to FIGURE 1, there is shown packaging apparatus 10 which in most respects is similar to that disclosed in the above-identified U.S. Patent 3,180,066. (For further information on details of this apparatus not disclosed herein, reference should be made to said U.S. Patent 3,180,066.) This apparatus 10 includes an endless chain of trays 12 which move with an intermittent motion past a series of packaging stations 14 disposed along the upper horizontal reaches of the endless chain.

The tray movement past the packaging stations is from right-to-left as viewed in FIGURE 1. The packaging stations are provided with various devices which operate to form the containers, deposit products therein, and complete the packages. Most of these operations take place during the machine "dwell" time, i.e. while the trays are momentarily stopped between indexing steps.

One of the first packaging operations performed in making the gas-tight container comprises the step of vacuum-forming a film of stretchable plastic down into the side-by-side tray receptacles 16a and 16b. This plastic film is applied to the trays in continuous sheet form from a supply roll 18. Subsequently, the products to be packaged are transferred from the loading platform (comprising spring-loaded trap doors, not shown) and into the tray receptacles by an automatic ram-type loader described in the above-identified U.S. Patent. The collated products are supplied to the loading platform by an infeed conveyor system 20 to be described in detail hereinbelow. After the products have been loaded in the tray receptacles, a second sheet of plastic film is placed over the trays from another supply roll 22. This second sheet is heat-sealed to the first layer to form completed containers which are evacuated or gas-filled to complete the package.

The products to be packaged, in this case frankfurters, are delivered to the loading station, generally indicated at 24, by the infeed conveyor system 20. Referring now to FIGURE 2, this conveyor system includes a closely-woven, stainless-steel wire-mesh belt 26 which moves at a periodically varying speed synchronized with the indexing movement of the trays 12. Above this belt, and moving in the same direction at the same speed, are a pair of side chains 28 and 30 and a center chain 32. As described in the above-identified U.S. Patent, the side chains are mounted in corresponding guide rails 34 and 36, while the center chain is positioned between upper and lower guide rails 38 and 40. It may be noted that although only one conveyor belt 26 is provided, the dual side-by-side arrangement shown effectively provides two separate conveyor troughs into which products can be placed from both sides of the conveyor system.

Supported by the chains 28, 30 and 32 are a plurality of molded plastic flights 42 (e.g. formed of the plastic known commercially as Delrin) which are spaced equidistantly in a longitudinal direction along the chains. The side chains 28 and 30 each carry a single series of these flights which face inwardly towards the center chain. The center chain, in turn, carries a double series of flights which face outwardly towards the side chains and are positioned directly opposite corresponding side chain flights.

Referring also to FIGURES 3 through 5, each of the flights 42 is mounted on its support chain by means of a special chain link 44 which is formed with a right-angled extension 46 adapted to fit in a slot 48 in the flight. The flight is fastened to this link by a rivet 50 extending through aligned holes in the flight and the link extension.

Each of the flights 42 comprises two distinct and separate members 52 and 54 both of which extend transversely out over the corresponding conveyor trough in a direction perpendicular to the support chains. These flight members 52 and 54 are spaced apart longitudinally a distance which is small relative to the center-to-center spacing between successive flights, e.g. in the present case about 20% of this spacing, and in any event substantially less than 50% of this spacing. The front member 54 extends out transversely a greater distance than the rear member 52, and is ribbed to provide narrow supporting lands adapted to engage the product. Such narrow lands are advantageous because they allow the product to slide more readily than a broad flat surface.

Reverting to FIGURE 2, the flight arrangement disclosed herein is especially adapted to handle groups of products of different size. For example, when frankfurters of smaller size are to be packaged, they all are collated, as generally indicated at 56, in the box-shaped conveyor compartment which is outlined by the rear transverse members 52 of one set of flights 42a and the front transverse members 54 of the next set of flights 42b. Thus the group of ten frankfurters in five-over-five configuration and having, for example, a net weight of 12 oz. can readily be collated and carried to the loading station for transfer to the container-forming receptacles in the trays 12.

Alternatively, a 16 oz. group of ten larger frankfurters can be collated in five-over-five configuration as generally indicated at 58. In this case, four of the five frankfurters in each layer are placed in the compartment between the rear members 52 of one flight set 42c and the front members 54 of the next flight set 42d, while the fifth frankfurter in each layer is placed in the region defined between the rear and front members 52 and 54 of each flight set 42c.

Accordingly, it will be evident that the present invention provides flexibility in permitting product groups of varying size to be collated and conveyed to the loading station for transfer to the tray receptacles. This apparatus can accommodate not only frankfurters of different sizes as described herein, and of either single or double layers, but also both round and square stacks of luncheon meat. Such substantial changes in product size can be handled without any modification to the collating and conveying portions of the equipment, so that production need not be interrupted for altering spatial dimensions in the collating and conveyor equipment. Of course, it may in general be necessary to make alterations in other parts of the machine, such as by changing the size of the fillers in the trays and substituting a different-sized loading apparatus, but such changes are relatively simple in comparison with the changes in the collating and conveyor systems that would be required in the absence of the present invention.

Although a specific preferred embodiment of the invention has been set forth in detail, it is desired to emphasize that this is not intended to be exhaustive or necessarily limited; on the contrary, the showing herein is for the purpose of illustrating the invention and thus enable others skilled in the art to adapt the invention in such ways as meet the requirements of particular applications, it being understood that various modifications may be made without departing from the scope of the invention as limited by the prior art.

I claim:

1. Packaging apparatus for packaging products such as meat and the like in containers formed of plastic sheet material, said apparatus comprising, in combination, a plurality of interconnected container-forming receptacles adapted to carry a film of packaging material and mounted for movement successively past a product loading station, infeed conveyor means for delivering the products to said loading station for transfer successively to corresponding receptacles, support means extending along said conveyor means and driven a synchronism therewith, a series of flight means carried by said support means and positioned over said conveyor means at locations spaced apart in a longitudinal direction along said conveyor means to define compartments in which collated groups of products are placed and to aid in pushing the products onto said loading station, each of said flight means comprising first and second members spaced apart longitudinally a distance which is small relative to the average longitudinal center-to-center spacing between successive flight means, the first member of each flight means being positioned closer to said loading station than the second member of the same flight means, all of said members extending transversely with respect to said conveyor means, the forward surfaces of the first members of any flight means and the rear surfaces of the second members of the next flight means defining a conveyor compartment to be used for small size products, and the first and second members of any one flight means outlining a region therebetween adapted to receive a portion of larger size products.

2. A packaging machine for packaging products such as meat and the like in sealed containers formed of plastic sheet material, comprising, in combination, a plurality of interconnected container-forming receptacles adapted to carry a film of plastic sheet material and mounted for movement successively past a product loading station, infeed conveyor means for delivering the products to said loading station for transfer successively to corresponding receptacles, support means extending along said conveyor means and driven in synchronism therewith, a series of flight means carried by said support means and positioned over said conveyor means at locations spaced equidistantly in a longitudinal direction along the two sides of said conveyor means to define compartments in which collated groups of products are placed and to aid in pushing the products onto said loading station, the flight means on one side of said conveyor means being located directly opposite corresponding flight means on the other side, each of said flight means comprising first and second members spaced apart longitudinally a distance which is small relative to the longitudinal center-to-center spacing between successive flight means, the first member of each flight means being positioned closer to said loading station than the second member of the same flight means, all of said members extending from the corresponding side of said conveyor means transversely towards the center of said conveyor means, the forward surfaces of the first members of any flight means and the rear surfaces of the second members of the next flight means defining a conveyor compartment to be used for a group of small size products, and the first and second members of any one flight means outlining a region therebetween adapted to receive a portion of a group of larger size products.

3. Apparatus as claimed in claim 2, wherein one of said first and second members is longer than the other of said first and second members, as measured in said transverse direction.

4. Apparatus as claimed in claim 3, wherein the second member of each flight means is longer than the first member.

5. Packaging apparatus for packaging products in containers formed of gas-tight plastic sheet material, comprising, in combination, a plurality of interconnected trays defining container-forming receptacles adapted to receive a film of plastic sheet material to be drawn therein to define a part of the final container, said trays being mounted for movement successively past a product loading station, infeed conveyor means including a flexible belt for delivering the products to said loading station for transfer successively to corresponding receptacles, support means extending along said conveyor means and moving in synchronism therewith, said support means comprising first and second flexible elongated means spaced transversely with respect to said container means, at least a portion of said flexible belt being disposed between and below said first and second elongated means, a series of flight means carried by said first and second elongated means and positioned over said belt at locations spaced equidistantly in a longitudinal direction to define compartments in which collated groups of products are placed and to aid in pushing the products onto said loading station, the flight means of said first elongated means being located directly opposite the corresponding flight means of said second elongated means, each of said flight means comprising first and second members spaced apart longitudinally a distance which is small relative to the longitudinal center-to-center spacing between successive flight means, the first member of each flight means being positioned closer to said loading station than the second member of the same flight means, all of said members extending from the corresponding side of said conveyor means transversely towards the center of said conveyor means, the forward surfaces of the first members of any flight means and the rear surfaces of the second members of the next preceding flight means defining a conveyor compartment to be used for small size products, and the first and second members of any one flight means outlining a region therebetween adapted to receive a portion of larger size products.

6. Apparatus as claimed in claim 5, wherein each of said flight means is an integral device including said first and second members and a third member joining said first and second members at their ends adjacent the corresponding support means.

7. Apparatus as claimed in claim 6, wherein each of said flight means is a molded plastic element.

8. Apparatus as claimed in claim 7, wherein said flight means have a generally J-shaped configuration as seen in plan view.

9. Apparatus as claimed in claim 5, wherein said first and second members are spaced apart a distance which is approximately 20% of the longitudinal center-to-center spacing between successive flight means, so that said apparatus is particularly adapted for collating and conveying different sized groups of frankfurters.

10. In packaging apparatus for packaging products such as meat and the like in containers formed of plastic sheet material, said apparatus being of the type comprising a plurality of interconnected container-forming receptacles adapted to carry a film of packaging material and mounted for movement successively past a product loading station, infeed conveyor means for delivering the products to said loading station for transfer successively to corresponding receptacles, support means extending along said conveyor means and driven in synchronism therewith, a series of flight means carried by said support means and extending transversely over said conveyor means at locations spaced apart in longitudinal direction along said conveyor means to define compartments in which collated groups of products are placed and to aid in pushing the products onto said loading station; the improvement in said apparatus wherein each of said flight means comprises first and second members spaced apart longitudinally, the first and second members of each flight means defining the longitudinal limits of a first conveyor compartment, the first member of any flight means and the second member of the next flight means defining the longitudinal limits of a second conveyor compartment, said first and second members being so spaced along said conveyor means that the longitudinal dimension of one of said compartments is an integral submultiple of the longitudinal dimension of the other of said compartments.

11. Apparatus as claimed in claim 10, wherein each of said flight means is a one-piece structure.

12. Apparatus as claimed in claim 10, wherein the longitudinal dimensions of said first and second compartments are in the ratio of 1:4.

References Cited by the Examiner
UNITED STATES PATENTS 805,736  11/1905  Lindgren _____ 198—164 X SAMUEL F. COLEMAN, *Primary Examiner.*

EDWARD A. SROKA, *Examiner.*